United States Patent
Friend et al.

(10) Patent No.: US 6,668,358 B2
(45) Date of Patent: Dec. 23, 2003

(54) DUAL THRESHOLD GATE ARRAY OR STANDARD CELL POWER SAVING LIBRARY CIRCUITS

(75) Inventors: David Michael Friend, Rochester, MN (US); Nghia Van Phan, Rochester, MN (US); Byron D. Scott, Rochester, MN (US); Daniel Lawrence Stasiak, Rochester, MN (US); Bradley Craig White, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 09/968,376

(22) Filed: Oct. 1, 2001

(65) Prior Publication Data

US 2003/0070147 A1 Apr. 10, 2003

(51) Int. Cl.[7] .............................................. G06F 17/50
(52) U.S. Cl. ........................................................ 716/2
(58) Field of Search ........................................ 716/1–18

(56) References Cited

U.S. PATENT DOCUMENTS

| | | | | |
|---|---|---|---|---|
| 5,970,018 A | * | 10/1999 | Iwata et al. | 365/230.06 |
| 6,038,386 A | * | 3/2000 | Jain | 395/500.17 |
| 6,111,427 A | * | 8/2000 | Fujii et al. | 326/34 |
| 6,407,945 B2 | * | 6/2002 | von Schwerin et al. | 365/185.18 |
| 6,426,261 B1 | * | 7/2002 | Fujii et al. | 438/276 |

OTHER PUBLICATIONS

NN9211233, "Algorihtm for Logic Block Power Level Optimization Based on Timing Slack," IBM technical Disclosure Bulletin, Nov. 1992, US.*

L. C. Zhong and H. Zou, An Enhanced Dual Threshold Voltage Leakage Control Technique for a Sub 500PS 64–Bit Adder, EE241 Spring 2001, pp. 1–7.

J. Adam Butts and G. S. Sohi, A Static Power Model for Architects, Proceedings of the 33rd Annual IEEE/ACM International Symposium on Microarchitecture, 2000, pp. 191–201.

A. Sinha and A. P. Chandrakasan, Energy Aware Software, Thirteenth International Conference on VLSI Design, 2000, pp. 50–55.

Q. Wang and S. Vrudhula, Static Power Optimization of Deep Submicron CMOS Circuits for Dual $V_t$ Technology, Proceedings of the International Conference on Computer–Aided Design, 1998, pp. 490–496.

* cited by examiner

*Primary Examiner*—Vuthe Siek
(74) *Attorney, Agent, or Firm*—Robert R. Williams

(57) ABSTRACT

A method is disclosed wherein a subset of logic blocks on an ASIC simiconductor logic chip is examined for replacement by functionally equivalent logic blocks in the ASIC library. The functionally equivalent logic block replacements are designed to exhibit, on average, significantly less subthreshold leakage currents. The replacement blocks are slower performing blocks, and therefore, checks are made to ensure that timing requirements are not violated.

2 Claims, 13 Drawing Sheets

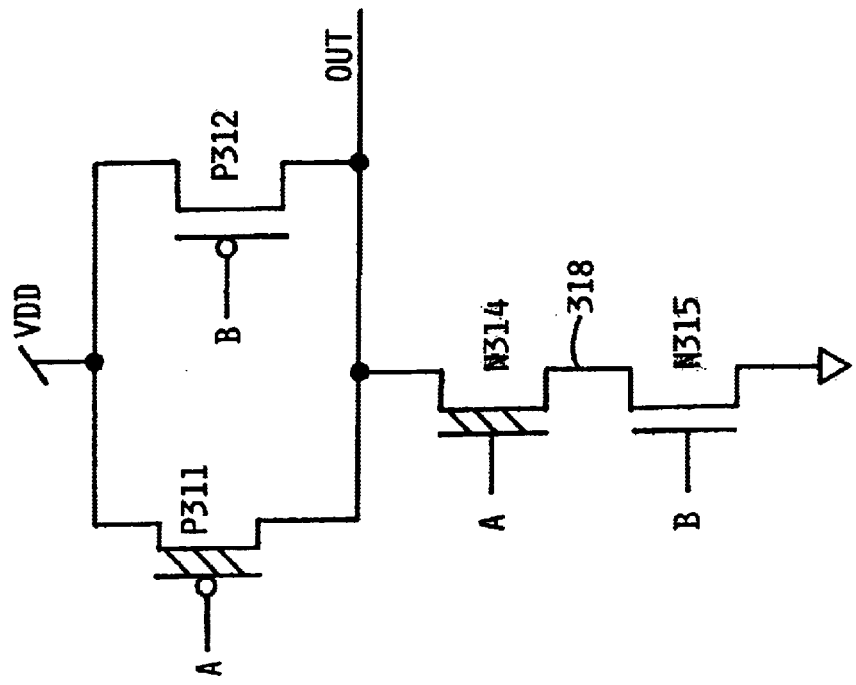
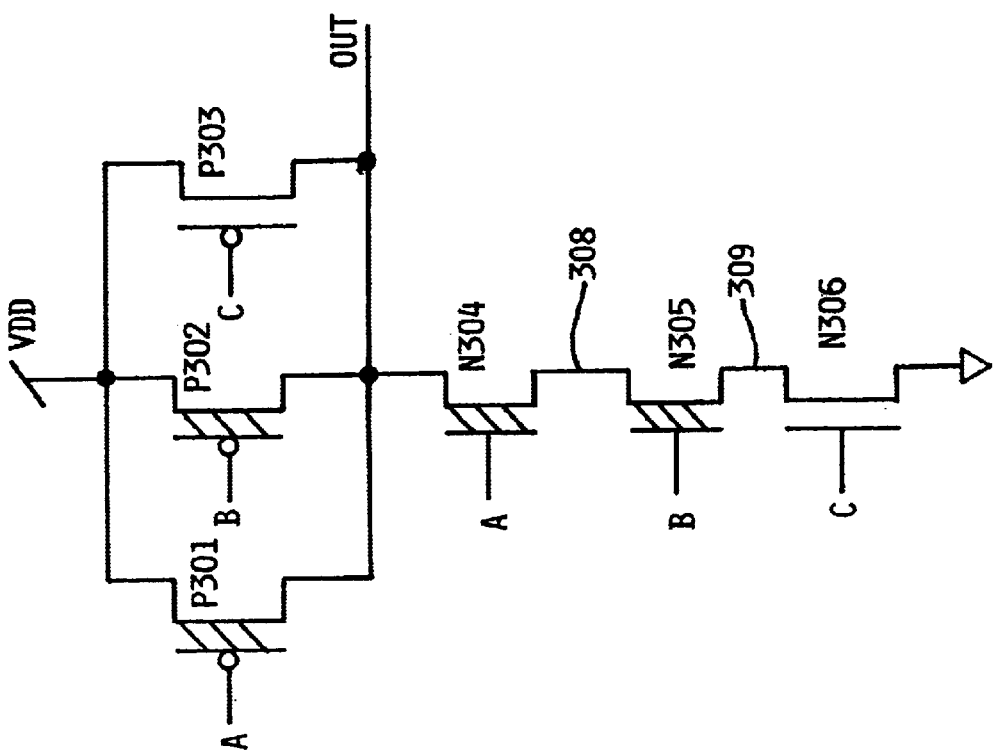

DUAL THRESHOLD GATE ARRAY OR STANDARD CELL POWER SAVING LIBRARY CIRCUITS

FIELD OF THE INVENTION

This invention relates to Complimentary Metal Oxide Semiconductor (CMOS) Application Specific Integrated Circuit (ASIC) libraries, and in particular to reduction of power dissipated in such libraries where multiple threshold options are available for the Field Effect Transistors (FETs) used in the libraries.

BACKGROUND OF THE INVENTION

The history of computer and related electronic circuitry has seen a constant movement to faster and lower powered circuits. In computers of the early 1950's, vacuum tubes were used as the switching elements. Vacuum tubes operated by heating a cathode with a filament, causing thermionic emission of electrons, which were then attracted to an anode biased positively relative to the cathode. Applying a low voltage on a control grid placed between the cathode and the anode could halt flow of the electrons. The heating requirement caused large amounts of static power to be dissipated. Static power is power dissipated independent of switching activity, and occurs whether the vacuum tube is in a conducting or a nonconducting state, or both.

Vacuum tubes were replaced in time by circuits comprising bipolar transistors. The dominant logic circuit families were Transistor Transistor Logic (TTL) and Emitter Coupled Logic (ECL). Both of these types of circuits also dissipated static power. ECL, in particular, was known for high power requirements. Computers implemented in TTL or ECL logic families dominated the 1960 to 1990 time frame. Increasingly elaborate cooling techniques were created to cool the computers of that era. Computers such as the IBM 3081 used pistons pressed against the semiconductor logic chips to remove heat from the chips. The heat was then transferred from the pistons to a heat sink. The heat sink was water-cooled.

CMOS logic circuits came into wide use in computer systems in the 1990s. CMOS in the 1990s was characterized by relatively high supply voltage. 5.0 volts, 3.3 volts, 2.5 volts, and 1.8 volts were commonly used for the supply voltage. These supply voltages allowed for the FET thresholds to be relatively high while still supporting relatively high performance. The amount of current an FET conducts, and therefore the performance, is strongly dependent on the supply voltage minus the FET threshold voltage. If the supply voltage is reduced, it is advantageous, therefore, to also reduce the FET threshold.

FETs with high thresholds have negligible leakage when the FET is "off", that is, the FET gate voltage is set such that the FET does not conduct. In the "off" case of an N-channel FET (NFET), the gate voltage would be set at a low voltage, usually ground. In the case of a P-channel FET (PFET), the gate voltage would be set at a high voltage, usually the supply voltage. CMOS logic circuits constructed of such FETs dissipate very little static power. Properly designed CMOS logic circuits have either a conducting path to ground through an NFET network, or a conducting path to the supply voltage through a PFET network. During a switch, CMOS circuits do have a brief time when both the NFET network and the PFET network are partially conducting. Current flowing from the supply voltage to ground during this time is called shoot-through current. Except for power associated with shoot-through current, power in such CMOS logic is almost totally dynamic power, which charges and discharges capacitances of gates, wiring, and parasitic device capacitances. Dynamic power in CMOS is usually calculated with the equation, $P=\frac{1}{2}*C*V*V*f$, where P is the dynamic power, C is the amount of capacitance switched, V is the supply voltage, and f is the frequency at which the capacitance is switched.

It is immediately apparent from the equation that lowering the supply voltage can dramatically reduce the dynamic power. Supply voltage has indeed been lowered over the years, from 5 volts to 3.3 volts to 2.5 volts, to 1.8 volts. Although in a given technology, performance will degrade with reduced supply voltage, performance has been maintained or improved by advancing the FET technology. Some of the advances have included making the FET channels shorter, making the FET gate oxides thinner, and reducing the FET thresholds.

A problem has recently arisen as decreasing supply voltage approaches 1.0 volt. Maintaining performance has required reduction of FET thresholds to the point that, even when the device is "off", substantial subthreshold leakage occurs. This leakage causes power dissipation that has become a significant percentage of the total power of a logic chip.

A number of CMOS processes have begun to offer multiple, usually two, FET threshold options. This is called Dual VT technology. FET threshold voltage is called VT. The FETs with higher thresholds (high VT) are slower than the FETs with lower thresholds (low VT). FET threshold differences can be accomplished in several ways, such as varying the doping in the silicon, or lengthening the channels of FETS where a higher threshold is desired. Previous work has led to methods that use Dual VT technology in custom integrated circuits to reduce the subthreshold leakage. "Static Power Optimization of Deep Submicron CMOS Circuits for Dual VT Technology", by Qi Wang and Sarma B. K. Vrudula, of the Center for Low Power Electronics, ECE Department, University of Arizona, Tucson, Ariz. 85721, describes an algorithm for assignment of an FET with a higher VT in places where performance will not be compromised. Another previous effort applicable in custom circuit design is "An Enhanced Dual Threshold Voltage Leakage Control Technique for a Sub-500PS 64-bit Adder", by Lizhi Charlie Zhong and Hongjing Zou. Yet a third previous effort applicable in custom circuit design is "A Static Power Model for Architects", by J. Adam Butts and Gurindar S. Sohi.

All of the above efforts apply higher VT FET devices in a custom circuit design to reduce static power.

Much of the logic used in today's computers and related equipment use ASICs. An ASIC design system provides a designer with a predesigned set, or library, of logic blocks. The designer builds the desired logic function on the chip by selecting from the library and specifying the interconnection of the blocks. The design system further provides rules governing valid interconnection topologies, delay computation, system timing, and other control or checking information needed to guarantee functionality of the logic function of the chip. Since all of the blocks in the library are predesigned, the ASIC designer has no ability to change the circuit design of any of the blocks. Therefore, the algorithmic selection of FET thresholds available to the custom circuit designers as referenced above is not available to the ASIC designer.

Therefore, a need exists to give the ASIC designer the capability to reduce static power in a Dual VT technology ASIC design system by providing appropriate Dual VT circuit logic blocks in the ASIC library, and a method to select and use those blocks effectively.

SUMMARY OF THE INVENTION

A principal object of the present invention is to reduce the average subthreshold leakage current on ASIC chips by providing a set of low leakage logic blocks that are functionally equivalent to other logic blocks that are faster, but which have significant leakage currents, and substituting the low leakage logic blocks where timing margin permits.

In brief, a method and a set of low leakage logic blocks are provided. The method initializes all instantiations of logic blocks on the chip to the faster, but leaky, versions of the logic blocks. All delays on the chip are computed. All timing margins (slacks) are computed for all inputs and outputs of each instantiation.

Each inverter logic block is then considered for replacement by a low leakage version of the inverter function. The replacement will be done and made permanent if timing margin permits.

After all inverters on the chip are considered, two input NANDs, and, optionally, two input NORs, are considered. In this part of the method, an attempt is made to replace each faster, but more leaky, usage of two input NANDs and NORs with a low leakage version. Functionally equivalent inputs can be swapped based on timing considerations. If a replacement violates timing constraints, the original logic block is restored, along with the input assignments and timings that existed prior to the replacement.

After all two input NANDs and NORs have been considered, the method makes an attempt to replace to replace each faster, but more leaky, usage of three input NANDs and, optionally, three input NORs, with a low leakage version of that logic function. Again, functionally equivalent inputs can be swapped based on timing considerations. If a replacement violates timing constraints, the original logic block is restored, along with the input assignments and timings that existed prior to the replacement.

The low leakage version of the inverters, NANDs, and NORs discussed above are designed with some of the FET devices implemented with high threshold devices in a dual VT technology. Alternatively, some of the FET devices can be designed with channel lengths longer than a minimum length specified for a particular technology.

BRIEF DESCRIPTION OF THE DRAWINGS

FIGS. 3A–3E show CMOS NAND, NOR, and inverter circuits using high VT devices in a preferred embodiment of the invention.

DETAILED DESCRIPTION OF THE PREFERRED EMBODIMENTS

In the following discussion, a "0" logic level is substantially ground voltage and will be referred to as "0". Similarly, a "1" logic level is substantially at VDD voltage, and will be referred to as VDD.

Having reference now to the figures, FIGS. 1A–1E show conventional, low VT, CMOS logic blocks for NAND and NOR circuits. Blocks having up to three inputs are shown, however, more inputs can be implemented. In particular, in CMOS, practical NAND circuits can have more than three inputs. CMOS NOR circuits are generally limited to two or three inputs for performance reasons, although CMOS NOR circuits with more than three inputs can be built.

Figure 1B:
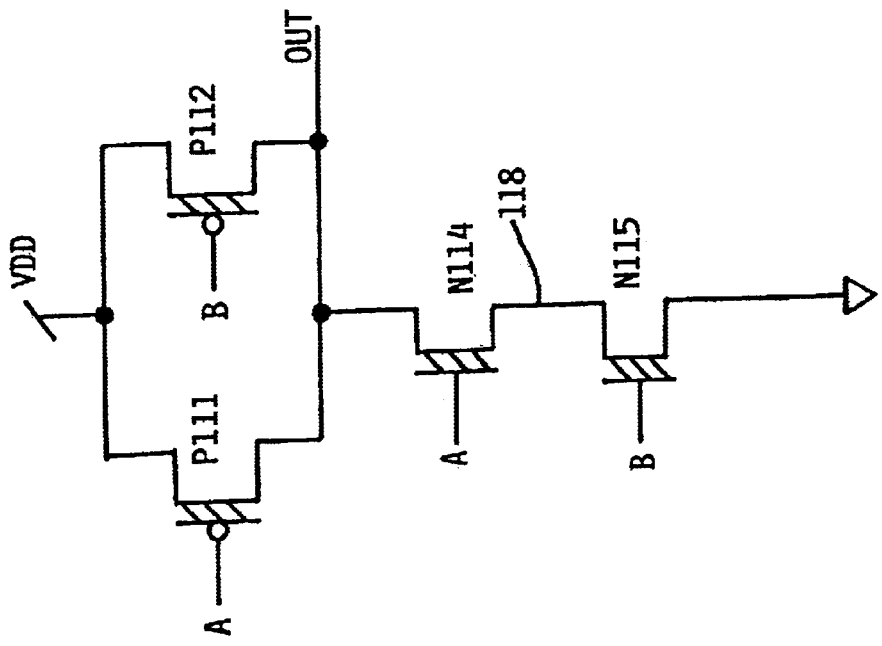
FIGS. 1A–1E show conventional CMOS NAND, NOR, and inverter circuits that use only low VT FET devices. Low VT FET devices are identified with hash marks in these, and subsequent, figures.
Figure 1A:
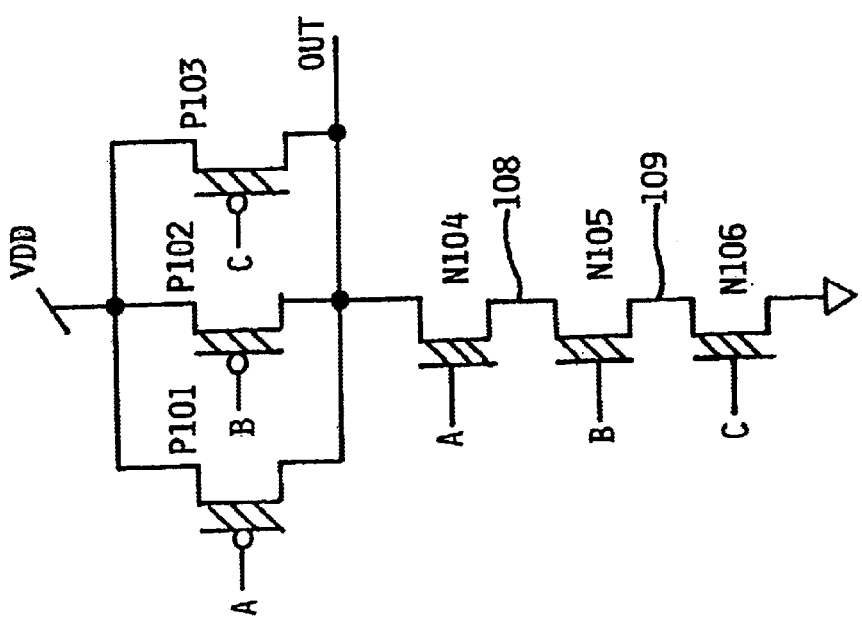

FIG. 1A shows a conventional CMOS three input NAND circuit, constructed with low VT FET devices, comprising three NFET devices, N104, N105, and N106, and complimentary PFET devices, P101, P102, and P103. NFET N104 and PFET P101 have gates electrically coupled to an input A; NFET N105 and PFET P102 have gates electrically coupled to an input B; NFET N106 and PFET P103 have gates electrically coupled to an input C. The NFETs are stacked in a conventional manner such that if all of the NFETs are conducting, a low resistance path from an output node, OUT, to ground is established. If any of the NFETs are nonconducting, the low resistance path to ground will be broken, and the complimentary PFET will create a low resistance path from the VDD supply to the output node, OUT. Nodes 108 and 109 are intermediate nodes in the stack of NFETs.

Figure 1D:
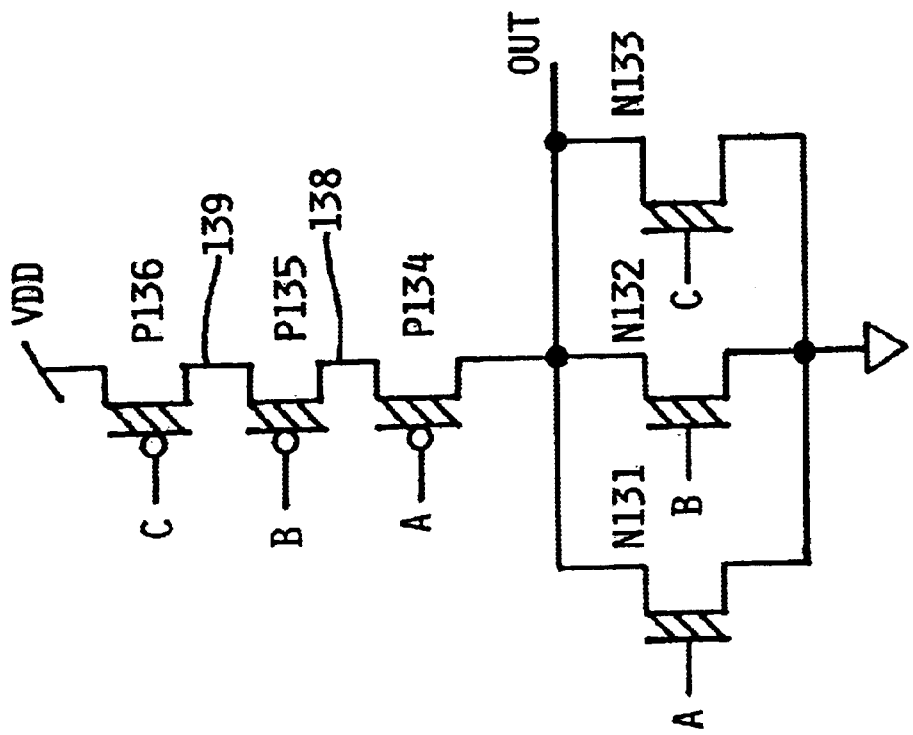
Figure 1C:
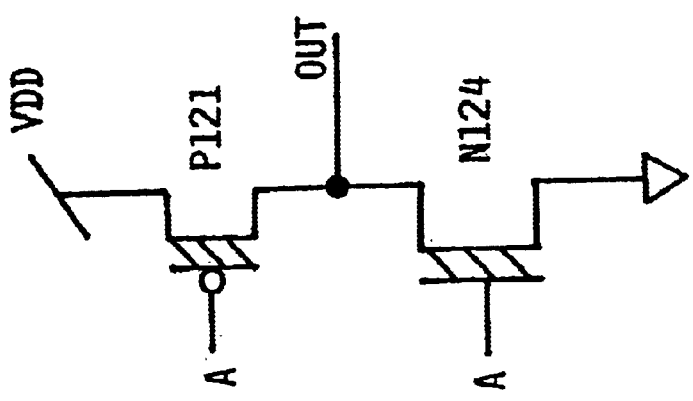
Figure 1E:
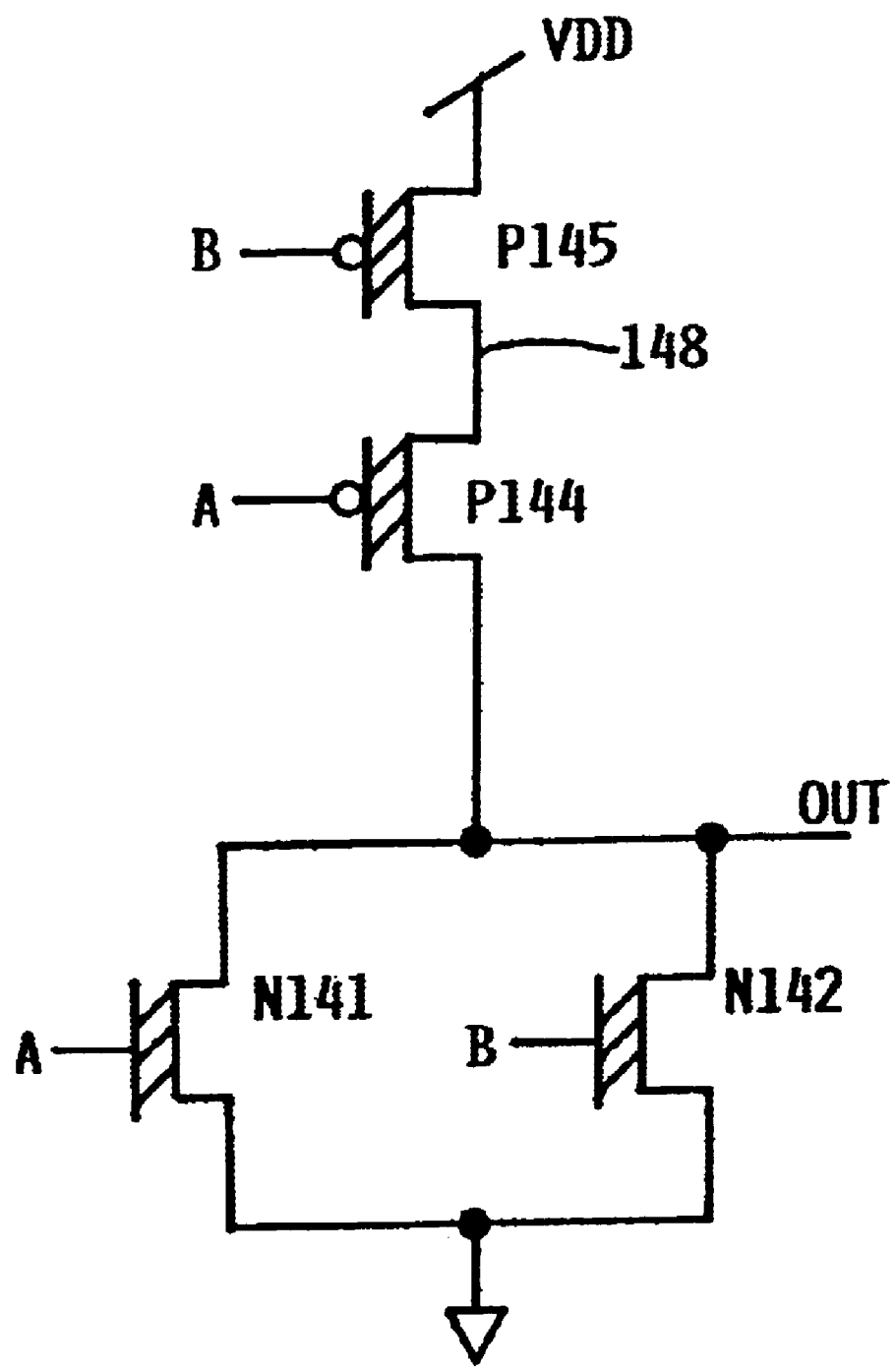

FIG. 1B shows a conventional two input NAND, comprising NFETs N114 and N115 and their corresponding complimentary PFETs, P111 and P112. FIG. 1C shows a conventional inverter, comprising NFET N124 and PFET P121. FIG. 1D shows a conventional three input NOR, comprising stacked PFETs P134, P135, and P136, and their corresponding complimentary NFETs N131, N132, and N133. FIG. 1E shows a conventional two input NOR, comprising stacked PFETs P144 and P145, and their complimentary NFETs N141 and N142.

CMOS technology has seen a steady improvement in performance over time. FET channel lengths are becoming shorter. FET gate oxides are becoming thinner. Performance of the FET devices is very dependent upon the channel lengths, the gate oxides, and gate to source voltage minus a FET device threshold voltage. In normal CMOS logic design, logic signals are at the lower supply (normally ground) for logic "low", and at the positive supply (normally VDD) for logic "high". Supply voltage (VDD) used with the CMOS logic has been dropping dramatically over time from 5.0 volts, to 3.3 volts, to 2.5 volts, and is currently approaching 1.0 volt. Since logic inputs are applied to FET gates in normal CMOS designs, the gate to source voltage is lower as VDD supply voltage is lowered. Technology developers have lowered FET threshold voltages to make the gate to drain minus the FET threshold (VT) as high as possible to enhance performance. FET thresholds have been lowered to the point that significant subthreshold leakage occurs. That is, even though the gate voltage is at ground for an NFET, or when the gate voltage is at VDD for a PFET, a significant current can still flow through the FET. Therefore, the circuits depicted in FIGS. 1A–1E will exhibit significant leakage.

FIGS. 2A–2D show leakage current, ILEAK, under the four input logic states possible for a two input NAND. ILEAK is drawn next to the leaking FET in all cases.

Figure 2B:
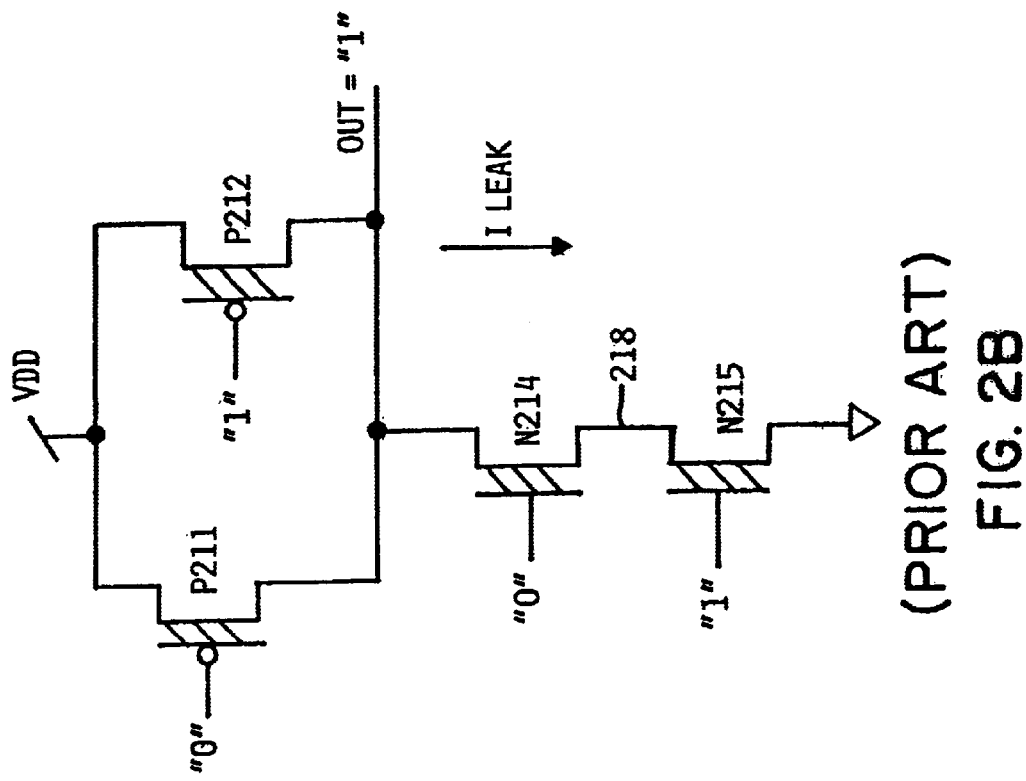
FIGS. 2A–2D show a conventional two input NAND circuit that uses only low VT FET devices, with devices subject to subthreshold leakage identified for different input voltage cases.
Figure 2A:
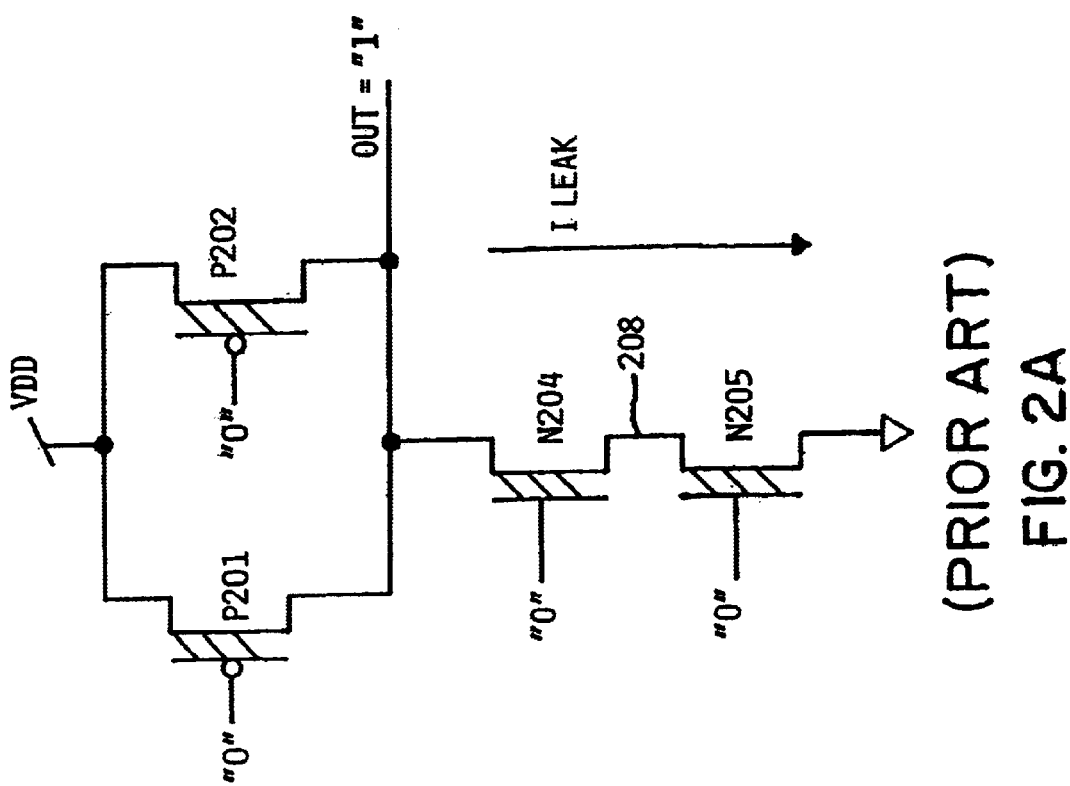

FIG. 2A shows a two input NAND wherein a "0" is applied to a gate on NFET 204, a gate on NFET 205, and their corresponding complimentary PFETs, P201 and P202. Both NFET N204 and NFET N205 in the stack should be "off", however a small leakage current flows through NFETs N204 and N205, shown by ILEAK passing through both NFET N204 and NFET N205. Both PFET devices, P201 and P202 are "on", pulling an output node, OUT, to VDD. Neither NFET N204 nor NFET N205 has the full VDD voltage from a drain to a source on each NFET, since the voltage is split in a complex way, and node 208 is at an intermediate voltage between the VDD voltage and ground. VDS is used to describe the voltage on an FET's drain measured relative to a source on that FET. The gate voltage on NFET N204 is less than the source voltage on NFET N204, greatly reducing ILEAK in this case. VGS is used to describe the voltage on an FET's gate measured relative to a source on that FET.

FIG. 2B shows a two input NAND wherein a "0" is applied to a gate of a top NFET N214, and a "1" is applied to a gate of a bottom NFET N215. In this case, NFET N215 is in a conducting state, and node 218 is discharged to "0". A source of NFET N214 is electrically coupled to node 218. A gate on PFET P211 has the same "0" applied that was applied to the gate of NFET N214. PFET P211 is therefore conducting, and pulls an output node, OUT, to a "1". NFET N214 therefore has a VDS equal to VDD, and substantial leakage will occur from a drain of NFET N214 to the source of NFET N214, as shown by ILEAK.

Figure 2D:
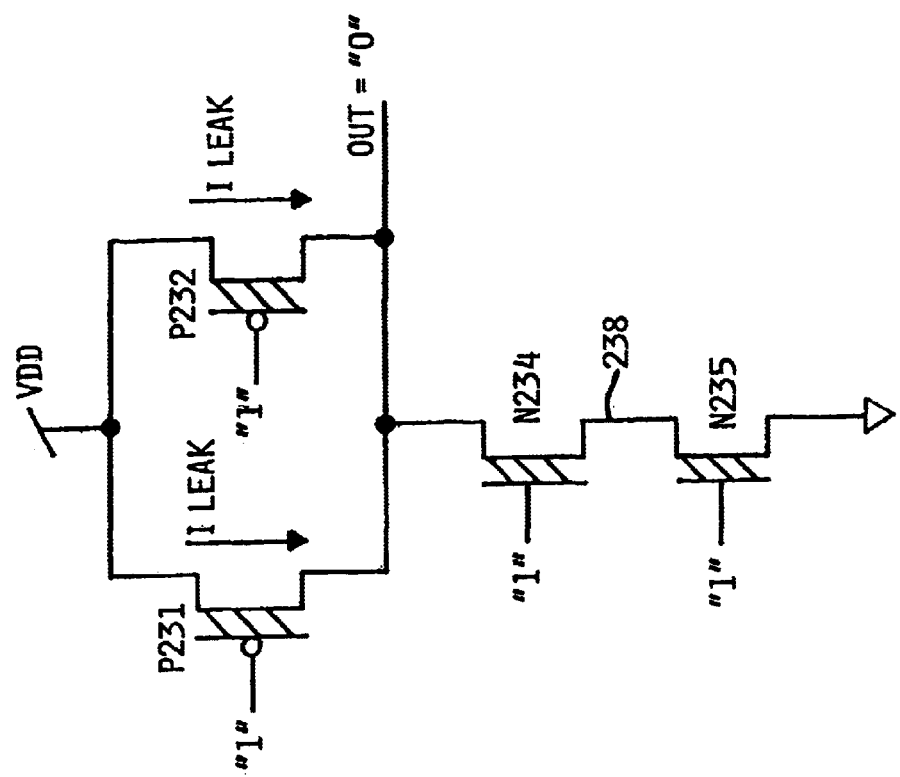
Figure 2C:
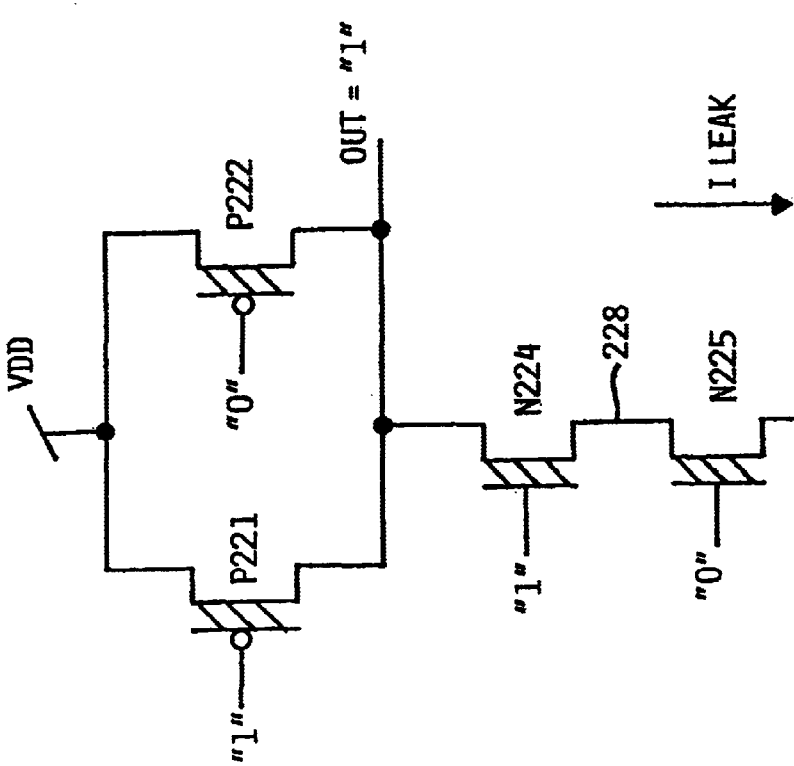

FIG. 2C shows a two input NAND wherein a "1" is applied to a gate of NFET N224, a top NFET in the stack, and a "0" applied to a gate of NFET N225, a bottom NFET in the stack. PFET P222 is the complimentary PFET of NFET N225, and thus has the "0" applied to its gate, causing PFET P222 to conduct and pull a node OUT to a "1". PFET P221, the PFET compliment of NFET N224, has a "1" applied to a gate, making PFET P221 nonconducting. Since node OUT is "1", and since NFET N224 is made conducting by the "1" on its gate, NFET N225 has a VDS of VDD and substantial leakage will occur from a drain of NFET N225 to the source of NFET N225.

FIG. 2D shows a two input NAND wherein a "1" is applied to a gate of NFET N234 and a gate of NFET N235, causing both NFETs to conduct, and pull a node OUT to a "0". Both PFET P231 and P232 have a gate voltage of "1" and are therefore nonconducting. Both PFETs P231 and P232 have a VDS of VDD, which causes substantial leakage to occur from a drain of PFET P231 to a source of PFET P231, and from a drain of PFET P232 to a source of PFET P232, as shown by ILEAK in the figure.

The above examples illustrate leakage situations for a two input NAND circuit. Similar leakage situations apply to inverters, NORs, and other CMOS logic blocks wherein a full VDD is applied across an FET.

FIGS. 3A–3E show preferred embodiments of the invention for a set of ASIC logic blocks, which, when added to the ASIC library, and used where timing margin allows, will reduce the average power of the ASIC logic chip.

FIG. 3A shows a three input NAND that is similar to the three input NAND shown in FIG. 1A with the exception that the bottom NFET in the stack, NFET N306, and its PFET compliment, PFET P303, have been replaced by high VT FETs. This invention includes FETs designed with longer channels as high VT devices. Longer channel FETs will have slightly higher VT's than devices that are made of the minimum FET channel length in a given technology. Under process variations in which channel lengths are shorter than nominal, the VT of longer channel FETs will remain relatively constant; the VT of FET devices designed with minimum channel length will decrease significantly. NFET N306 has a high enough VT such that when a gate voltage on NFET N306 is "0", no significant leakage occurs, even when the VDS of NFET N306 is VDD. When the gate voltage on NFET N306 is "1", some leakage will occur, dependent upon the logic state of the other two inputs, A and B. Leakage will also be significantly reduced over the conventional three input NAND in the case where inputs A, B, and C are all "1", in which a node OUT will be pulled to "0" and all three PFET FETs will have VDS=VDD from a drain to a source. Although, in this case, PFET P301 and PFET P302 will have subthreshold leakage equal to their equivalents in the conventional three input NAND as shown in FIG. 1A, PFET P303 will not contribute significant leakage. In this state, total leakage will be reduced by approximately ⅓. Table 1 shows a representative three input NAND leakage values for the eight different input states of inputs A, B, and C as shown in FIG. 1A and FIG. 3A. Table 1 shows that almost a third of the leakage can be eliminated by using a three input NAND that has the bottom NFET and its complimentary PFET implemented with high VT devices. An average savings of 46 uA will result from replacing the low VT block with a functionally equivalent high VT block.

TABLE 1

| Three Input NAND (46 $\mu$A savings) | | |
|---|---|---|
| Inputs ABC | Leakage of Low VT block | Leakage of High VT block |
| 000 | 0.673 $\mu$A | 0.0414 $\mu$A |
| 001 | 1.69 $\mu$A | 1.68 $\mu$A |
| 010 | 1.68 $\mu$A | 0.161 $\mu$A |
| 011 | 86.3 $\mu$A | 86.3 $\mu$A |
| 100 | 1.64 $\mu$A | 0.158 $\mu$A |
| 101 | 57.8 $\mu$A | 57.8 $\mu$A |
| 110 | 52.6 $\mu$A | 3.42 $\mu$A |
| 111 | 973 $\mu$A | 656 $\mu$A |
| Average | 147 $\mu$A | 101 $\mu$A |

FIG. 3B shows a two input NAND that is similar to the conventional two input NAND of FIG. 1B, however, the lower NFET in the stack, NFET N315 is a high VT NFET, and the complimentary PFET, P312, is a high VT PFET. When a gate of NFET N315 is low, NFET N315 has insignificant leakage. If NFET N315 is "1" and a gate of NFET N314 is low, node 318 will be at "0", PFET P311 will be conducting, and the VDS of NFET N314 will be VDD. Significant leakage will occur through NFET N314. When both the gate of NFET N315 and NFET 314 are "1", node OUT will be at "0", and both complimentary PFET devices P311 and P312 will be nonconducting. PFET P311 will have substantial leakage. PFET P312 will have insignificant leakage. Table 2 shows representative two input NAND leakage values for the four different input states, with inputs A and B as shown in FIGS. 1B and 3B. Table 2 shows that almost half of the leakage can be eliminated by using a two input NAND that has the bottom NFET and its complimentary PFET implemented with high VT devices. An average leakage reduction of 84 uA will result from replacing the low VT two input NAND with a functionally equivalent high VT two input NAND.

TABLE 2

Two Input NAND (84 µA savings)

| Inputs AB | Leakage of Low VT block | Leakage of High VT block |
|---|---|---|
| 00 | 1.29 µA | 0.125 µA |
| 01 | 64.8 µA | 64.8 µA |
| 10 | 43.5 µA | 3.00 µA |
| 11 | 602.0 µA | 308.0 µA |
| Average | 178 µA | 94.0 µA |

Figure 3D:
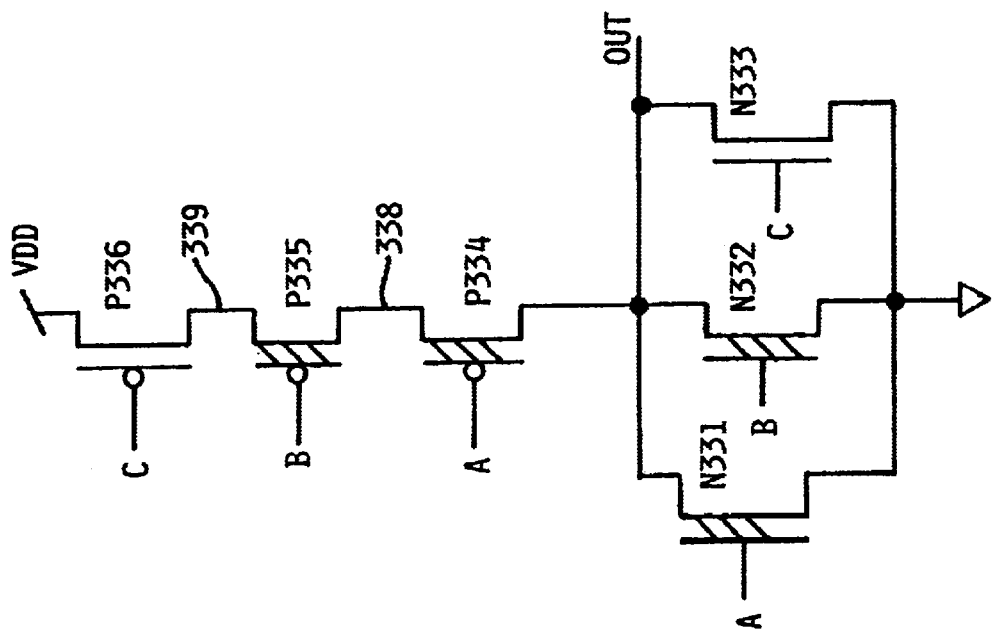
Figure 3C:
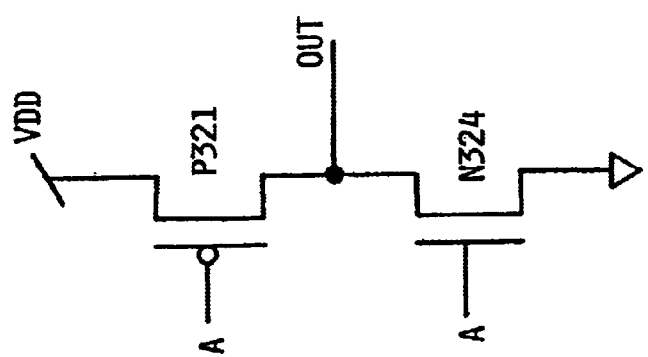

FIG. 3C shows a CMOS inverter comprising PFET P321 and NFET N324. A gate of PFET P321 and a gate of NFET N324 are electrically coupled to input A. Node OUT is the output node. Both FETs are built using high VT FET devices. Insignificant leakage occurs whether input A is "0" or "1" because in each case one of the FETs is nonconducting, and, being a high VT device, has very low leakage when nonconducting. Table 3 shows leakage comparison of such an inverter compared to a conventional inverter. Table 3 shows that using high VT devices for the NFET and the PFET can eliminate almost all of the leakage. An average leakage reduction of 157 uA will result from replacement of the low VT inverter with a high VT inverter.

TABLE 3

Inverter (157 µA savings)

| Input A | Leakage of Low VT block | Leakage of High VT block |
|---|---|---|
| 0 | 43.3 µA | 2.97 µA |
| 1 | 278.0 µA | 5.75 µA |
| Average | 161 µA | 4.36 µA |

Figure 3E:
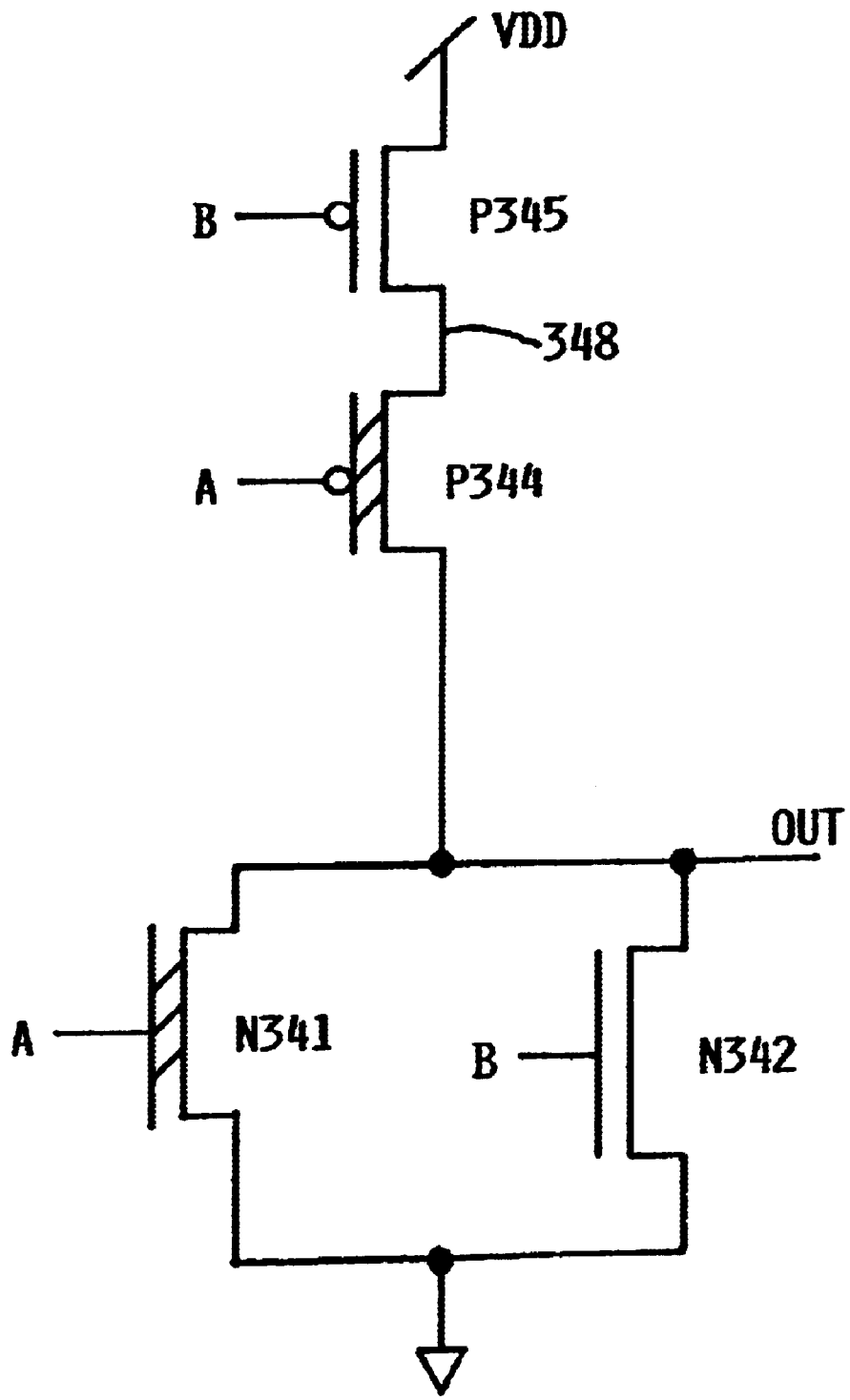

FIG. 3D and FIG. 3E show schematics of a three input NOR block and a two input NOR block. Exemplary leakage currents are not shown in tables for these blocks, but they exhibit leakage characteristics similar to their NAND counterparts.

A drawback in use of high VT FETs is that performance of a high VT FET is slower than performance of a low VT device. Referring to FIG. 3B, delay from a rising signal on input A to the fall of node OUT will be faster than a delay from a rising signal on input B to the fall of node OUT. Similarly, a delay from a falling signal on input A to the rise of node OUT will be faster than a delay from a falling signal on input B to the rise of node OUT. An exemplary delay difference is 30%, although that number would vary with technology. A method will be disclosed shortly explaining how high VT blocks can be used in an ASIC design flow.

Specialized variants of the new low leakage blocks are shown in FIGS. 4A–4D.

Figure 4B:
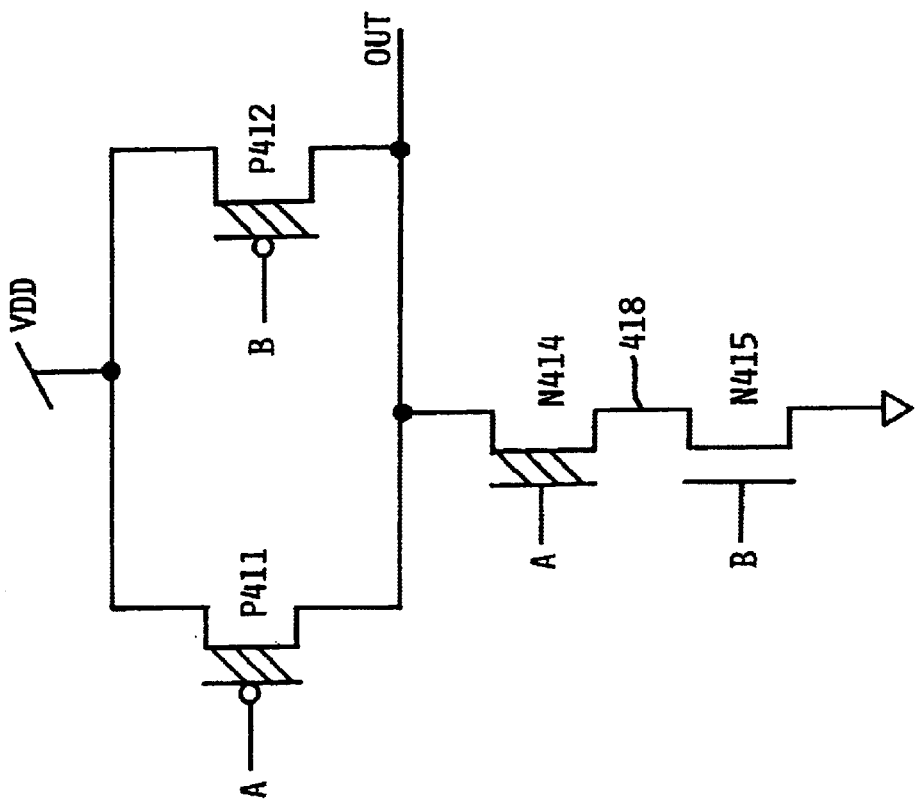
FIG. 4B shows another embodiment of the invention applied to a two input NAND.
Figure 4A:
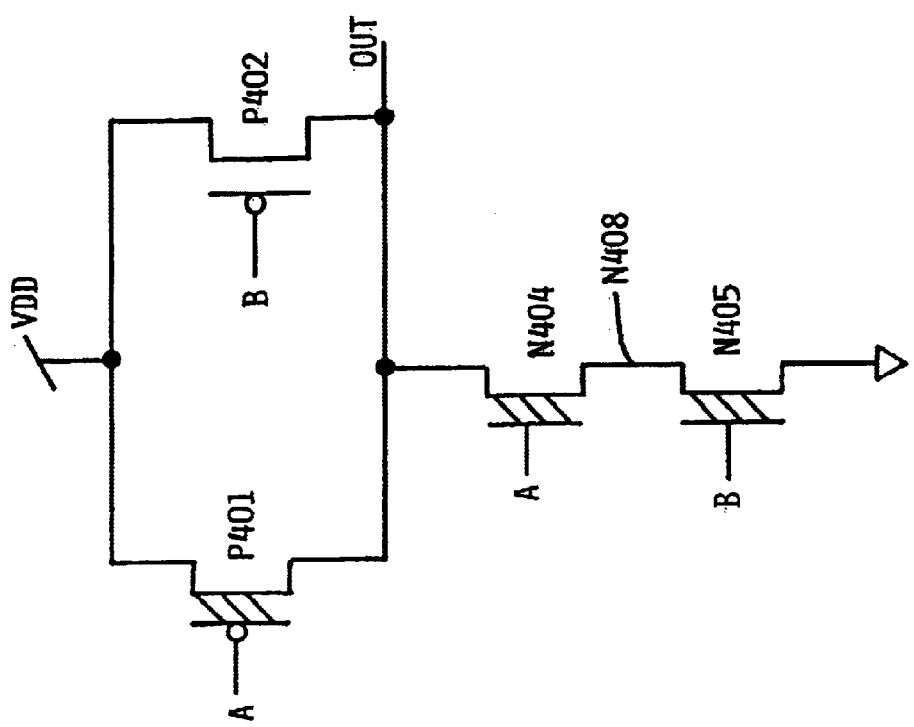
FIG. 4A shows another embodiment of the invention applied to a two input NAND.

FIG. 4A shows a two input NAND wherein only PFET P402 is a high VT device. Such a block could be used if a timing margin were to exist for input B falling to output OUT rising, but little or no timing margin were to exist for other delay paths.

FIG. 4B shows a two input NAND wherein only NFET N415 is a high VT device. Such a block could be used if timing margin were to exist for delays from either input A or input B rising to output OUT falling, but little or no timing margin were to exist for either input A or input B falling to output OUT rising.

Figure 4D:
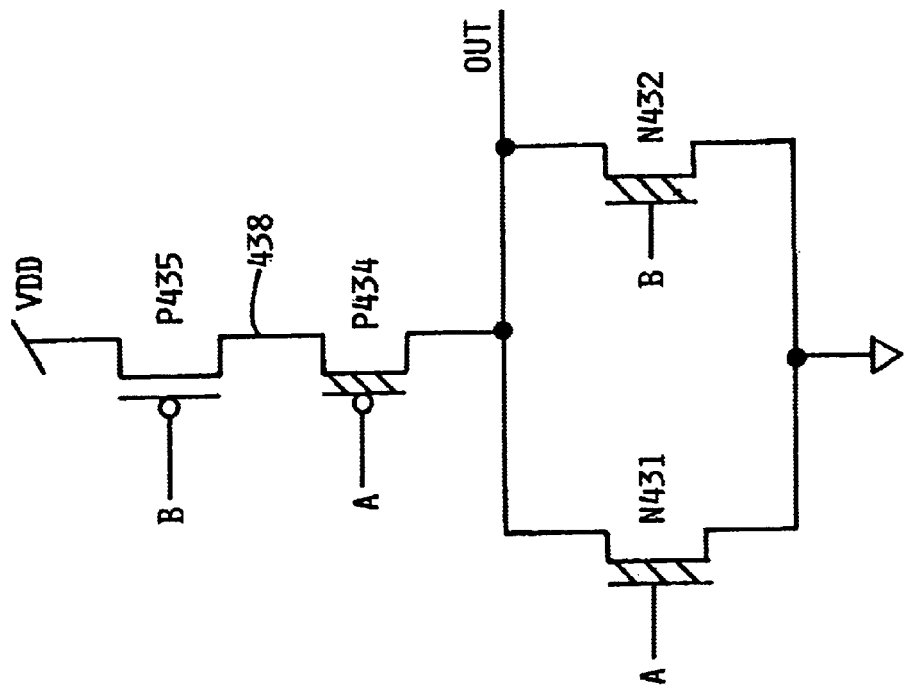
FIG. 4D shows another embodiment of the invention applied to a two input NOR.
Figure 4C:
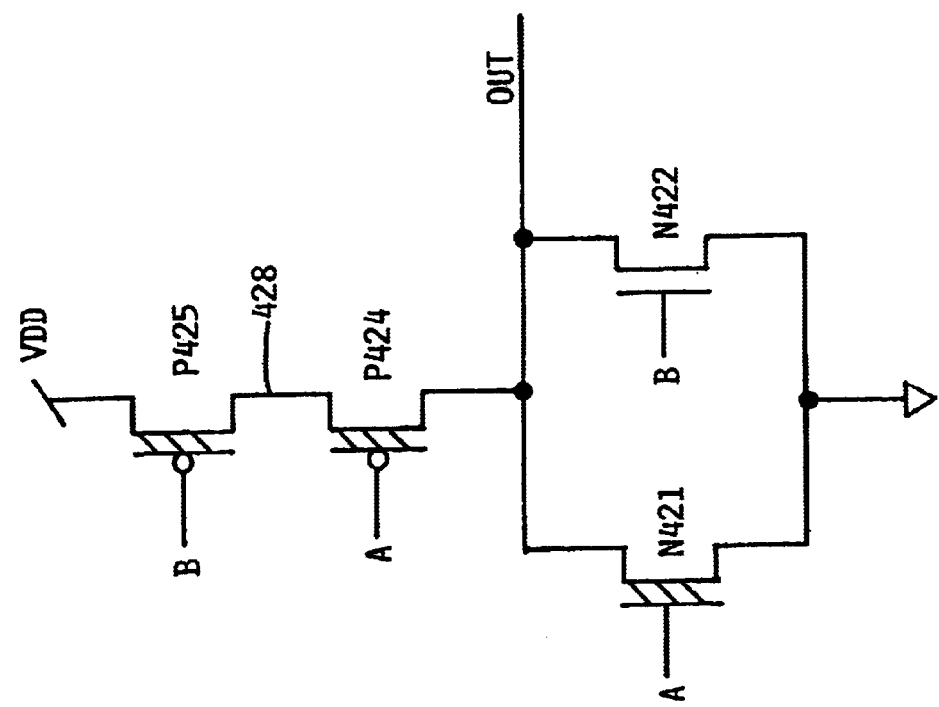
FIG. 4C shows another embodiment of the invention applied to a two input NOR.

FIG. 4C shows a two input NOR wherein only NFET N422 is a high VT device. Such a block could be used if timing margin were to exist for input B rising to output OUT falling, but little or no timing margin for other delay paths.

FIG. 4D shows a two input NOR wherein only PFET P435 is a high VT device. Such a block could be used if timing margin were to exist for delays from either input A or input B falling to output OUT rising, but little or no timing margin were to exist for input A or B rising to output OUT falling.

Other variants of these specialized books are contemplated, such as a block wherein both of the NFET devices are high VT or both of the PFET devices are high VT devices. Performance would suffer even more if such books were added to the ASIC library, and even more care would be required in using such blocks.

ASIC libraries generally consist of a large number of blocks, including such complex logic elements as exclusive-or functions (XOR), latches, AND-OR-INVERT (AOI). Versions of such blocks could be created with high VT devices to further save leakage current. However, the inverter, the two and three way NAND blocks, and the two and three way NOR blocks are normally the most used blocks, often making up well over half the area on the ASIC chip. Creating high VT versions of seldom-used blocks would greatly expand the ASIC library size for a relatively small payback in power savings. Expansion of the ASIC library is expensive in design resource, ASIC design maintenance, and library storage requirements. In addition, a process for use of such complex logic elements would be difficult to develop. Although the current invention contemplates complex versions of such blocks the focus is on the limited set of logic primitives comprising an inverter, a two input NOR, a two input NAND, a three input NOR, and a three input NAND.

Figure 5A:
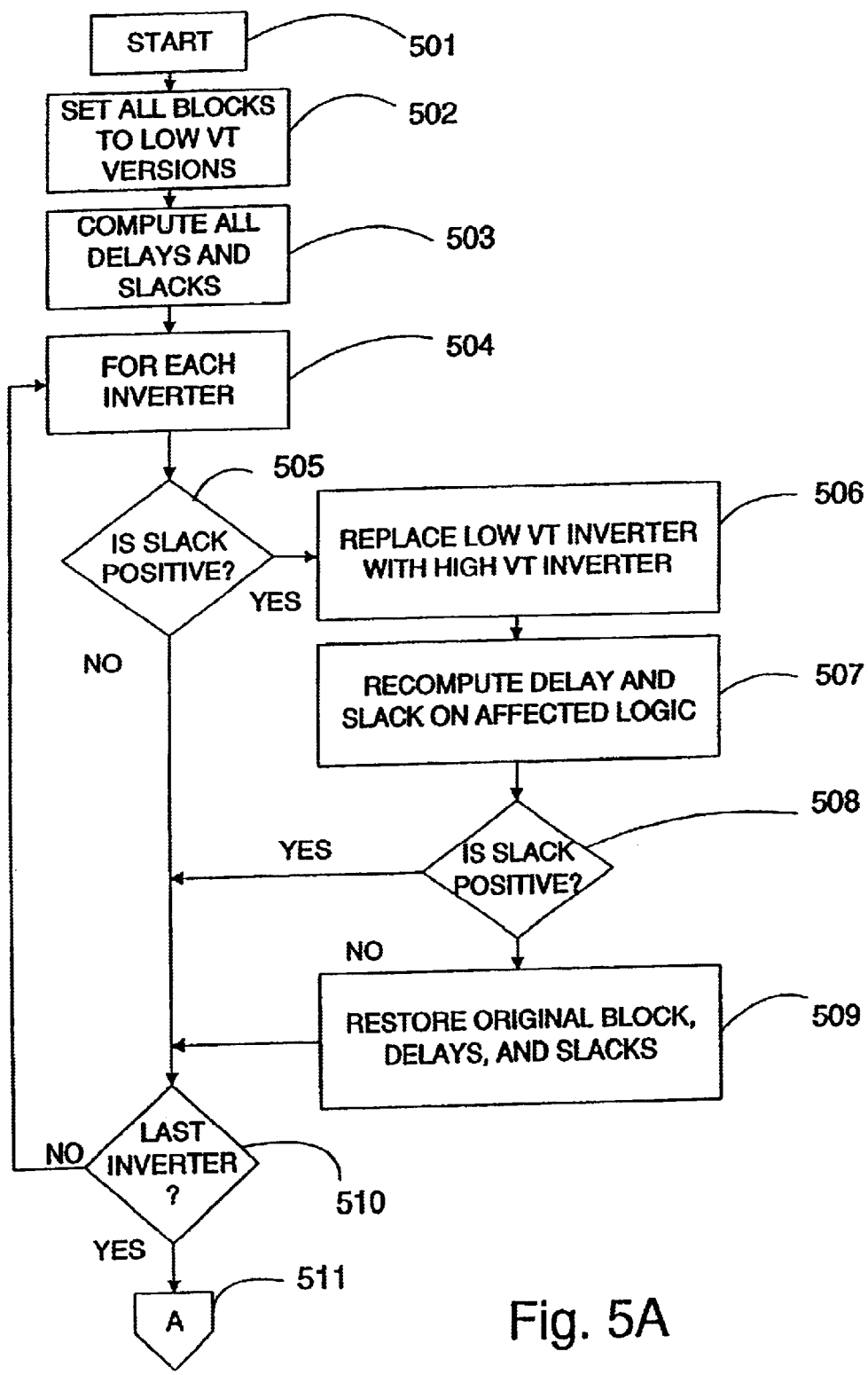
FIGS. 5A–5C together show a flow chart that details the method by which low VT blocks are replaced by high VT blocks.
Figure 5B:
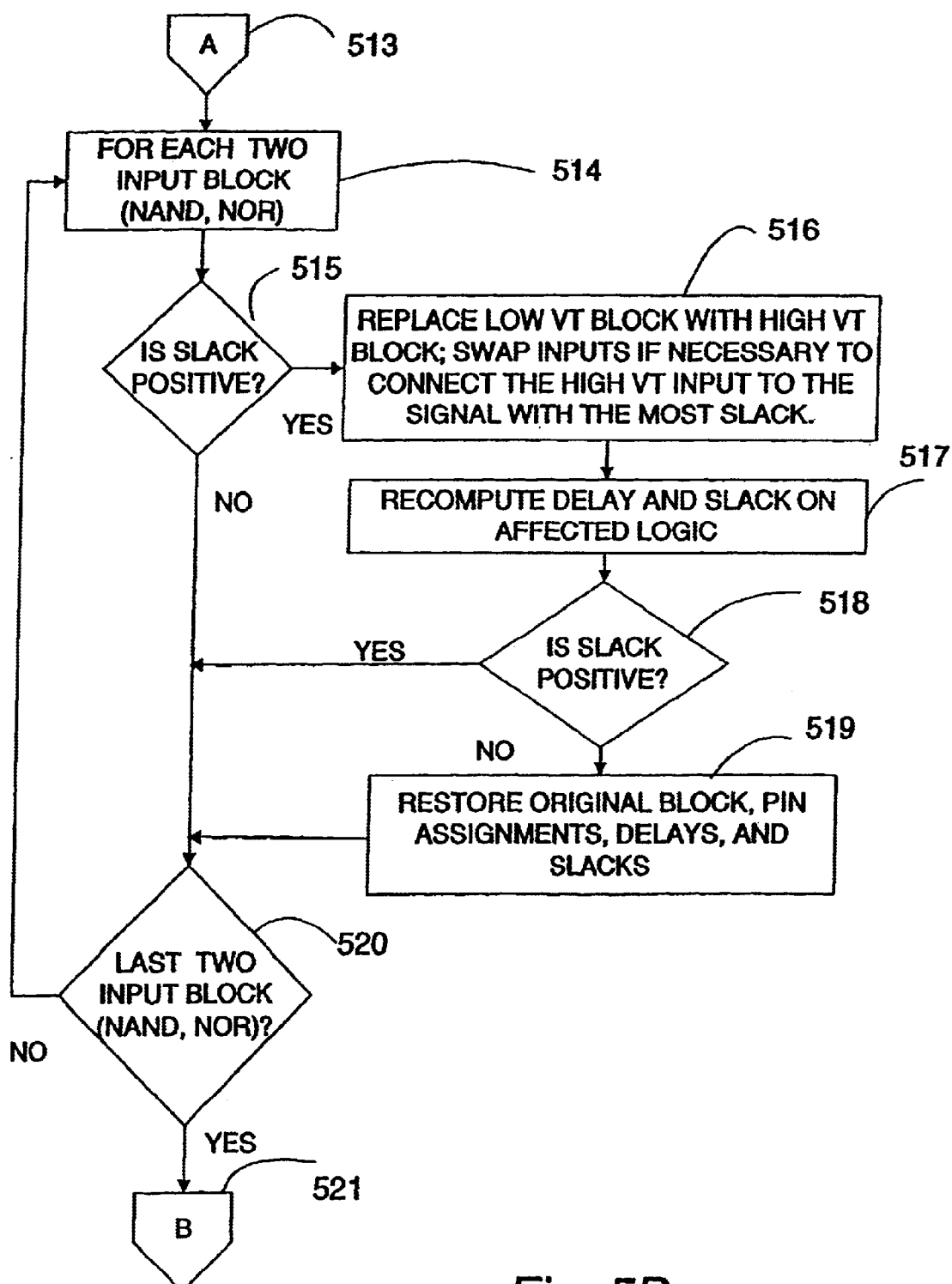
Figure 5C:
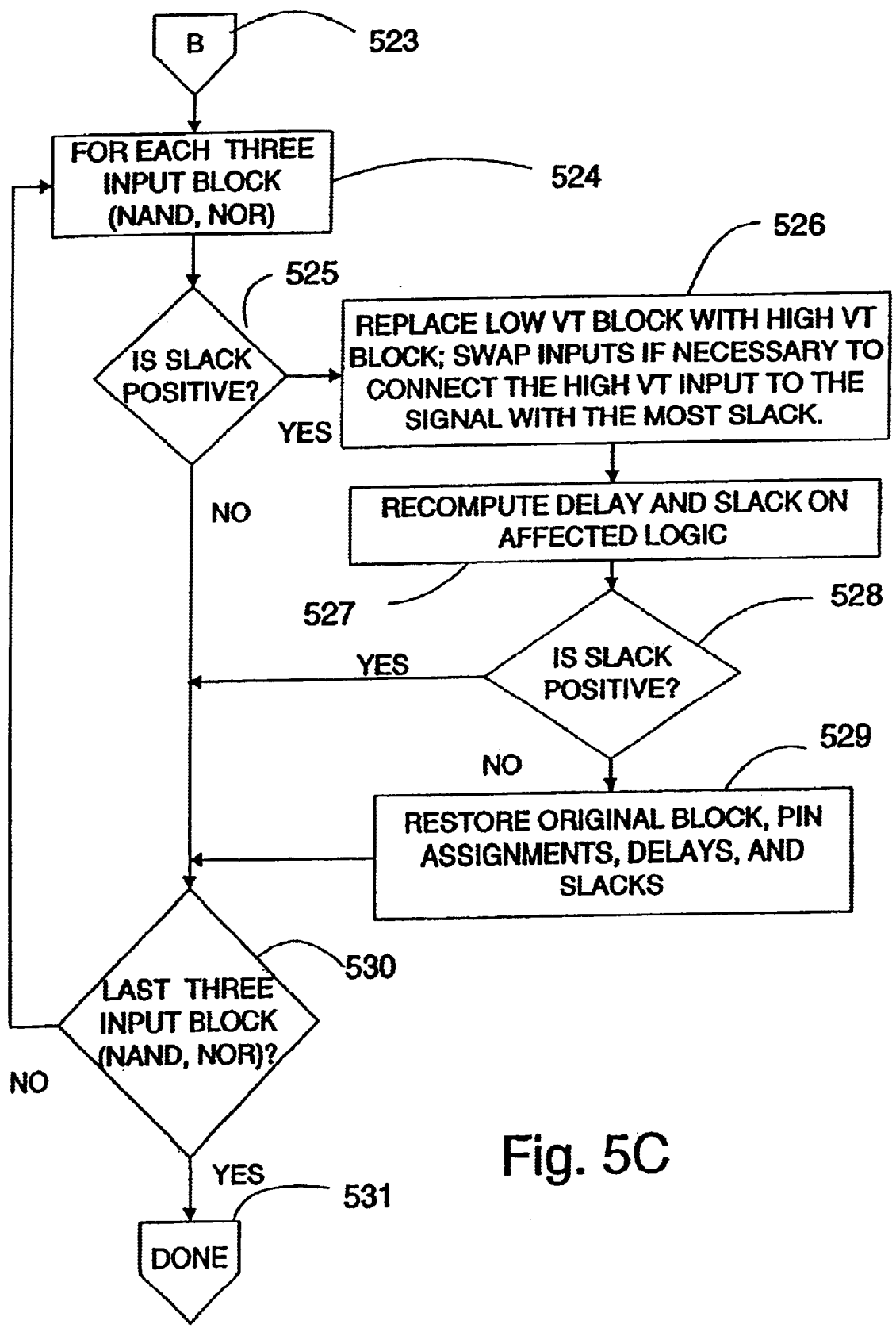

FIGS. 5A–5C collectively show the process flow that replaces low VT blocks with high VT blocks.

Tables 1–3 above show that the first set of blocks to be considered for replacement is the set of inverters on the ASIC chip. Every time an inverter implemented with low VT FETs is replaced by an inverter implemented with high VT FETs, almost all leakage is eliminated for that instantiation of the inverter. The second set of blocks to be considered for replacement is the set of two input blocks, comprising two input NANDs and NORs on the ASIC chip. Every time a two input NAND implemented with low VT FETs is replaced by a two input NAND implemented with high VT FETs, approximately half the leakage is eliminated for that instantiation. The third set of blocks to be considered for replacement is the set of three input blocks comprising three input NANDs and three input NORs. Each time a low VT version of such a block is replaced by a high VT version, approximately one third of the leakage is eliminated for that instantiation.

The process flowchart description for replacement of low VT blocks with high VT blocks begins on FIG. 5A. Step 501 is the starting point. In step 502, all blocks are initialized to low VT blocks from the ASIC library. This provides for the fastest delays and therefore the maximum timing margin, or slack, that the ASIC library will allow. In step 503, all delays and slacks are computed for the ASIC chip. Positive slack means timing margin exists. For example, a two input NAND might have 100 picoseconds (ps) slack on a first input, but only 40 ps on a second input. ASIC design systems typically provide timing margin information for each transition direction for each pin. This information can be used by the design system for pin swapping (reconnecting signals to logically equivalent inputs) or choosing different, but functionally equivalent, logic blocks.

Step 504 in FIG. 5A begins a loop in which each inverter in the ASIC chip is checked for slack and is replaced by a high VT version of the inverter if timing margin allows. Step 504 selects an inverter from the set of all inverters on the ASIC chip. Step 505 does an initial check for positive slack. If slack is negative, the path does not meet timing requirements and no attempt will be made to replace the instant low VT inverter with a high VT inverter. If slack is positive, step 506 replaces the instant low VT inverter with a high VT version from the ASIC library. Delays and timing margins are recomputed in step 507 for the logic paths affected by the replacement. Block 508 checks slack after the replacement. If slack is positive, the replacement is a valid replacement, and control passes to step 510. If slack is negative, the timing requirements have been violated by the block replacement, and control passes to step 509, which restores the low VT block, the original delays, and the original slacks as they existed prior to the block replacement. Step 510 passes control to step 511 if all inverters on the ASIC chip have been considered for replacement. If not all inverters have been considered for replacement, step 510 passes control to step 504, which repeats the loop for another inverter.

Step 511 is simply a connector, which transfers control to step 513 on FIG. 5B.

Referring now to FIG. 5B, we see the replacement steps for the two input NANDs and two input NORs.

Step 514 is similar to step 504 of FIG. 5A. Step 514 is the start of a loop which iterates through all two input NAND and two input NOR blocks on the ASIC chip. In this loop, the instant low VT two input block is considered for replacement by a high VT two input block to reduce leakage current.

Step 515 checks for positive slack on the instant two input block. If slack is negative, timing requirements are not met with the current blocks, and no attempt to use a high VT block is made. Control passes to step 520. However, if positive slack exists, control is passed to step 516.

Step 516 replaces the instant low VT block with a high VT block. Both inputs on a two input NAND or a two input NOR are logically equivalent. The signal with the largest positive slack is coupled to the input that drives the high VT FETs, input B in FIG. 3B or FIG. 3E. The signal with the smaller positive slack is coupled to the input that drives the remaining low VT FETs, as shown as input A in FIG. 3B or FIG. 3E.

Step 517 recomputes delays and slacks on all affected logic.

Step 518 checks timing margins after the trial replacement of the block as performed in step 516. If timing margin exists, the replacement is made permanent, and control is passed to step 520. If timing margin does not exist, control passes to step 519. Step 519 restores the block, the delays, the timing margins, and the assignment of signals to pins on the block to what they were prior to step 516. After this restoration, control is passed to step 520.

Step 520 is the end of the loop begun in step 514. If more two input blocks are to be considered, control passes to step 514; otherwise, control passes to step 521, which is a connector to step 523 on FIG. 5C.

The steps in FIG. 5C are the same as those of FIG. 5B, only here the three input NANDs and the three input NORs are considered.

Step 524 is the start of a loop which iterates through all three input NAND and three input NOR blocks on the ASIC chip. In this loop, the instant low VT three input block is considered for replacement by a high VT three input block to reduce leakage current.

Step 525 checks for positive slack on the instant three input block. If slack is negative, timing requirements are not met with the current blocks, and no attempt to use a high VT block is made. Control passes to step 530. If positive slack exists, control is passed to step 526.

Step 526 replaces the instant low VT block with a high VT block. The inputs on a three input NAND or a three input NOR are logically equivalent. The signal with the largest positive slack is coupled to the input that drives the gates of the high VT FETs, input C in FIG. 3A or FIG. 3D. The signal with the smallest positive slack is coupled to the input which drives the gates of the low VT FETs, input A in FIG. 3A or FIG. 3D. The signal with intermediate slack is coupled electrically to the remaining input of the NAND or NOR.

Step 527 recomputes delays and slacks on all affected logic.

Step 528 checks timing margins after the trial replacement of the block as done in step 526. If timing margin exists, the replacement is made permanent, and control is passed to step 530. If timing margin does not exist, control passes to step 529. Step 529 restores the block, the delays, the timing margins, and the assignment of signals to pins on the block to what they were prior to step 526. After this restoration, control is passed to step 530.

Step 530 is the end of the loop begun in step 524. If more three input blocks are to be considered, control passes to step 524; otherwise, control passes to step 531, which shows the completion of the process.

Obviously, if only a subset of the exemplary ASIC library extensions have been implemented, non-implemented blocks would not be considered in the process. For example, NOR logic blocks are used far less often in usual ASIC CMOS designs than are NAND logic blocks. Power savings gained from creation of high VT NOR blocks in the ASIC library would not be very large, and the ASIC library designer may choose not to implement high VT NOR blocks.

Clock signals are finely tuned in high performance designs, and logic blocks on clock signals would not normally be candidates for replacement. Therefore, blocks on clock signal paths are not considered part of the process taught by this invention.

While the present invention has been described with reference to the details of the embodiments of the invention shown in the drawings, these details are not intended to limit the scope of the invention as claimed in the appended claims.

What is claimed is:

1. A method of replacing low threshold voltage logic blocks wit high threshold voltage logic blocks in an ASIC design system, comprising the steps of:
   initializing all logic bloc s to low threshold voltage versions of said logic blocks;
   computing delays for al logic blocks;
   computing slack for all inputs and outputs of all logic blocks;
   iterating through all inverters, performing the following steps for each inverter:
   replacing each low threshold voltage inverter with a high threshold voltage inverter;

recomputing all delays and slacks in paths affected by each replacement of a low threshold voltage inverter, and checking if the replacement results in a negative slack;

restoring each said high threshold voltage inverter block to the original low threshold voltage inverter, and restoring the delays and slacks to their values prior to the replacement, if slack is found to be negative in the preceding step;

subsequent to iterating through all inverters, iterating through all two input NAND blocks, and, optionally two input NOR blocks, performing the following steps for each two input NAND, and, optionally, two input NOR:

replacing each low threshold voltage instance of said two input NAND and NOR blocks wit a high threshold voltage version of said two input NAND and NOR blocks;

reassigning input signals on each said two input NAND and NOR block to logically equivalent inputs by slack, coupling an input with a largest slack to an input on said two input NAND and NOR block with a largest delay characteristic, and an input with a smallest slack to an input on said two input NAND and NOR block with a smallest delay characteristic;

recomputing all delays and slacks in paths affected by each replacement of said low threshold two input NAND and NOR blocks, and checking if the replacement results in a negative slack; and restoring each said high threshold voltage replacing two input NAND and NOR block to the original low threshold NAND and NOR block, restoring the signal to input assignments existent prior to the reassignment step, and restoring the delays and slacks to their values prior to the replacement, if slack is found to be negative in the preceding step.

2. The method of claim 1, the method further comprising the steps of:

subsequent to iterating through all two input NAND blocks, and, optionally, two input NOR blocks, iterating through all three input NAND blocks, and, optionally, three input NOR block, performing the following steps for each three input NAND, and, optionally, three input NOR:

replacing each low threshold voltage instance of said three input NAND and NOR block with a high threshold voltage version of said three input NAND and NOR blocks;

reassigning input signals on each said three input NAND and NOR block to logically equivalent inputs by slack, coupling an input with a largest slack to an input on said three input NAND and NOR block with a largest delay characteristic, and an input with a smallest slack to an input on said three input NAND and NOR block with a smallest delay characteristic;

recomputing all delays and slacks in paths affected by each replacement of said low threshold three input NAND and NOR blocks, and checking if the replacement results in a negative slack; and restoring each said high threshold voltage replacing three input NAND and NOR block to the original low threshold voltage NAND and NOR block, restoring the signal to input assignments existent prior to the reassignment step, and restoring the delays and slacks to their values prior to the replacement, if slack is found to be negative in the preceding step.

* * * * *

UNITED STATES PATENT AND TRADEMARK OFFICE
CERTIFICATE OF CORRECTION

PATENT NO. : 6,668,358 B2
DATED : December 23, 2003
INVENTOR(S) : David Michael Friend et al.

It is certified that error appears in the above-identified patent and that said Letters Patent is hereby corrected as shown below:

Column 10,
Line 56, "wit" should be -- with --.
Line 58, "bloc s" should be -- blocks --.
Line 60, "al" should be -- all --.

Column 11,
Line 16, "wit" should be -- with --.

Column 12,
Line 8, "block" should be -- blocks --.

Signed and Sealed this

Sixteenth Day of March, 2004

JON W. DUDAS
*Acting Director of the United States Patent and Trademark Office*